United States Patent
Zhong et al.

(10) Patent No.: US 11,743,134 B2
(45) Date of Patent: Aug. 29, 2023

(54) PROGRAMMABLE TRAFFIC MANAGEMENT ENGINE

(71) Applicant: XILINX, INC., San Jose, CA (US)

(72) Inventors: Guanwen Zhong, Singapore (SG); Chengchen Hu, Singapore (SG); Gordon John Brebner, Monte Sereno, CA (US)

(73) Assignee: XILINX, INC., San Jose, CA (US)

( * ) Notice: Subject to any disclaimer, the term of this patent is extended or adjusted under 35 U.S.C. 154(b) by 88 days.

(21) Appl. No.: 17/065,438

(22) Filed: Oct. 7, 2020

(65) Prior Publication Data

US 2022/0109613 A1    Apr. 7, 2022

(51) Int. Cl.
| | |
|---|---|
| H04L 12/24 | (2006.01) |
| H04L 41/00 | (2022.01) |
| H04L 43/04 | (2022.01) |
| H04L 47/22 | (2022.01) |
| H04L 47/215 | (2022.01) |
| H04L 47/62 | (2022.01) |

(52) U.S. Cl.
CPC .............. *H04L 41/20* (2013.01); *H04L 43/04* (2013.01); *H04L 47/22* (2013.01); *H04L 47/215* (2013.01); *H04L 47/623* (2013.01)

(58) Field of Classification Search
CPC .......... H04L 43/04; H04L 47/22; H04L 41/20
USPC ........................................................ 370/235
See application file for complete search history.

(56) References Cited

U.S. PATENT DOCUMENTS

| | | | |
|---|---|---|---|
| 10,042,659 B1 | 8/2018 | Gupta et al. | |
| 10,212,135 B2 | 2/2019 | Pope et al. | |
| 10,659,555 B2 | 5/2020 | Pope et al. | |
| 10,686,731 B2 | 6/2020 | Pope et al. | |
| 2008/0107020 A1* | 5/2008 | Trinh | H04L 47/22 370/230.1 |
| 2011/0145412 A1* | 6/2011 | Ford | G06F 9/5077 709/226 |
| 2011/0227591 A1* | 9/2011 | Casters | H04L 25/0282 324/705 |
| 2012/0017077 A1* | 1/2012 | Darling | G06F 9/5077 713/100 |

(Continued)

OTHER PUBLICATIONS

Benacer et al. (A High-Speed, Scalable, and Programmable Traffic Manager Architecture for Flow-Based Networking, date of publication Dec. 18, 2018), IEEE Access,13 pages. (Year: 2018).*

(Continued)

*Primary Examiner* — Christopher M Crutchfield
*Assistant Examiner* — Jean F Voltaire
(74) *Attorney, Agent, or Firm* — Patterson + Sheridan, LLP

(57) ABSTRACT

Examples herein describe a programmable traffic management engine that includes both programmable and non-programmable hardware components. The non-programmable hardware components are used to generate features that can then be used to perform different traffic management algorithms. Depending on which traffic management algorithm the PTM engine is configured to do, the PTM engine may use a subset (or all) of the features to perform the algorithm. The programmable hardware components in the PTM engine are programmable (e.g., customizable) by the user to perform a selected algorithm using some or all of the features provided by the non-programmable hardware components.

20 Claims, 8 Drawing Sheets

(56) References Cited

U.S. PATENT DOCUMENTS

| | | | | |
|---|---|---|---|---|
| 2012/0020210 A1* | 1/2012 | Sonnier | ................ | H04L 47/621 |
| | | | | 370/230.1 |
| 2013/0201831 A1* | 8/2013 | Tai | .................... | H04L 47/6225 |
| | | | | 370/235 |
| 2015/0195282 A1* | 7/2015 | Radier | ................. | H04W 12/04 |
| | | | | 726/4 |

OTHER PUBLICATIONS

O'Neil et al. (A scalable and Programmable Modular Traffic Manager Architecture, May 2011, date of publication May 2011), 20 pages. (Year: 2011).*

Benacer Imad et al., "A Hi gh-Speed, Scal abl e, and Programmable Traffic Manager Architecture for Flow-Based Networking", IEEE Access, vol. 7, Jan. 11, 2011, paghes 2231-2243 [retri eved on Jan. 4, 2019] the whole document.

O'Neill Shane et al., "A Scalable and Programmable Modular Traffic Manager Architecture", ACM transactions on reconfigurable technology and systems, May 1, 2011, pp. 1-19, Retrieved from the Internet: URL:https://dl .acm.org/doi/pdf/10.1145/196 8502. 1968505 [retri eved on Nov. 12, 2021] figures 1 , 2, 4, 5, 9, 12-14 p. 1-p. 14.

* cited by examiner

| Algorithms | Queue ID (qid) | Packet length (pktlen) | Virtual time (vt) | Previous departure time (pre_dt) | Weight | Aggregated weight (weight_sum) |
|---|---|---|---|---|---|---|
| First in, first out | ✓ | ✗ | ✓ | ✗ | ✗ | ✗ |
| Strict priority | ✓ | ✗ | ✗ | ✗ | ✓ | ✗ |
| Start-time fair queueing | ✓ | ✓ | ✓ | ✓ | ✓ | ✓ |
| Virtual clock | ✓ | ✓ | ✓ | ✓ | ✓ | ✗ |
| Weighted fair queueing | ✓ | ✓ | ✓ | ✓ | ✓ | ✓ |
| Self-clocked fair queueing | ✓ | ✓ | ✓ | ✓ | ✓ | ✓ |
| Worst-case fair weighted queueing | ✓ | ✗ | ✓ | ✓ | ✗ | ✗ |
| Stop-and-go queueing | ✓ | ✗ | ✓ | ✓ | ✓ | ✗ |
| Service-curve earliest deadline first | ✓ | ✗ | ✓ | ✓ | ✓ | ✗ |

FIG. 7

| Algorithms | Features | | | |
|---|---|---|---|---|
| | Queue ID (qid) | Weight | Packet length (pktlen) | Quantum |
| Round robin | ✓ | ✗ | ✗ | ✗ |
| Weighted round robin | ✓ | ✓ | ✗ | ✗ |
| Deficit round robin | ✓ | ✓ | ✓ | ✓ |

FIG. 8

PROGRAMMABLE TRAFFIC MANAGEMENT ENGINE

TECHNICAL FIELD

Examples of the present disclosure generally relate to a programmable traffic management engine that includes hardware components that can be programmed to perform different traffic management services (e.g., packet scheduling, shaping, and policing).

BACKGROUND

Data centers provide an infrastructure containing thousands of servers and accommodate many simultaneous tenants running a vast variety of services such as Web services, Web indexing, batch analytics, storage services, machine learning applications, video streaming and financial services. These applications or services typically have different characteristics and throughput/latency requirements. To offer quality of service (QoS), fairly share resources, and improve network utilization, data centers require traffic management services such as packet scheduling, shaping, and policing to regulate network resources for tenants.

However, these traffic management services are currently provided by software applications executing on central processing units (CPUs) in the servers which incurs high CPU utilization and reduces the available CPU processing power for other tasks. This increases the cost of running datacenter services and lowers QoS in terms of fairness, traffic latency, and throughput, especially for high-speed line-rate (40 Gbps-100 Gbps) cloud architectures. While performing some of these traffic management services in hardware would reduce the burden on the CPUs, current off-the-shelf high speed network interface cards (NICs) do not perform any traffic management services. Although line-rate switches support some traffic management services, they typically provide a very limited combination of scheduling algorithms including deficit round robin and strict priority on application specific integrated circuits (ASICs). The line-rate switches lack programmability and customization as a network operator cannot modify and replace the existing algorithms provided on those switches.

SUMMARY

Techniques for implementing a programmable traffic management (PTM) engine are described. One example is a PTM engine that includes non-programmable hardware components configured to generate a predefined number of features to use as inputs for executing a network scheduling algorithm and programmable hardware components configured to execute different types of network scheduling algorithms, where, during operation, the programmable hardware components are configured to execute the network scheduling algorithm using at least one of the predefined number of features provided by the non-programmable hardware components One example described herein is a method that includes providing a network scheduling algorithm to be performed by a PTM engine comprising non-programmable hardware components and programmable hardware components, identifying features used as inputs to the network scheduling algorithm, configuring the non-programmable hardware components to provide the features to the programmable hardware components, and configuring the programmable hardware components to execute the network scheduling algorithm using the features.

One example described herein is an integrated circuit that includes non-programmable hardware components configured to generate a predefined number of features to use as input for executing a network scheduling algorithm and programmable hardware components configured to execute different types of network scheduling algorithms, where, during operation, the programmable hardware components are configured to execute the network scheduling algorithm using at least one of the predefined number of features provided by the non-programmable hardware components.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 7 is a table of example dispatch time algorithms that can be supported by features generated by the programmable traffic management engine, according to an example.

FIG. 8 is a table of example round robin algorithms that can be supported by features generated by the programmable traffic management engine, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
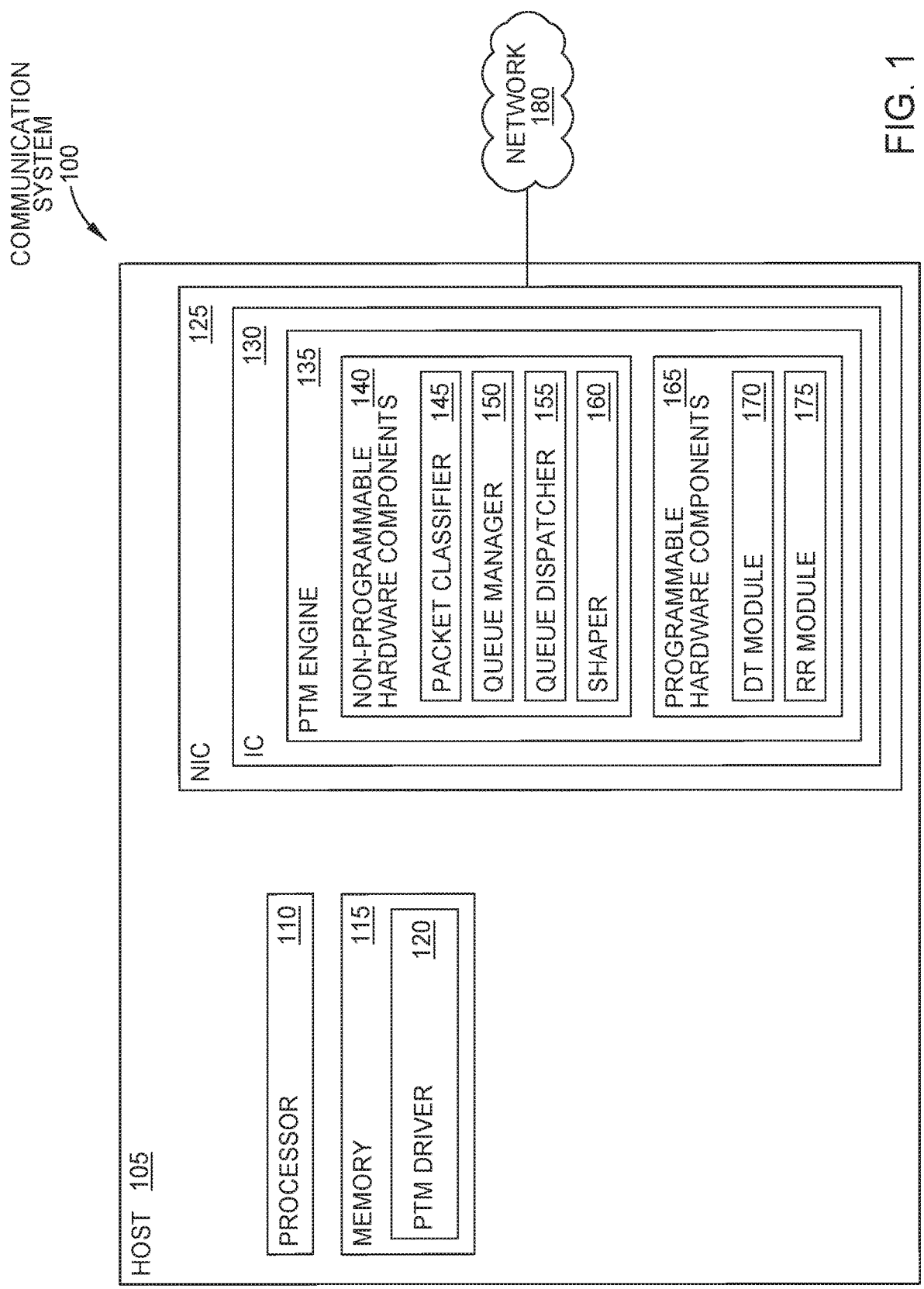
FIG. 1 is a block diagram of a communication system with a programmable traffic management engine, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The description herein describes a programmable traffic management (PTM) engine for high-speed line-rate architectures to address the above challenges. The advantages of the PTM engine is at least twofold: (i) provides a flexible traffic management offloading framework that can be easily deployed on high-speed line-rate programmable platforms such as NICs (including smartNICs), switches, and middle-boxes, and (ii) the PTM engine abstracts packet scheduling algorithms and enables developers to program and customize algorithms with high-level specifications such as C/C++ or register transfer level (RTL) design using Verilog/VHDL in the proposed traffic management architecture. The PTM engine simplifies the development of customized traffic management on hardware and developers can focus more on designing customized network scheduling algorithms.

In one embodiment, the PTM engine includes both programmable and non-programmable hardware components. The non-programmable (or shared) hardware components are used to generate a predefined number of features that can then be used to perform different traffic management algorithms such as departure time (DT) algorithms and round robin (RR) algorithms. Depending on which traffic management algorithm the PTM engine is configured to do, the PTM engine may use a subset (or all) of the features to perform the algorithm.

The programmable hardware components in the PTM engine are programmable (e.g., customizable) by the user to perform a selected algorithm using some or all of the features provided by the non-programmable hardware components. The programmable hardware components may include programmable logic or a domain specific engine that can be programmed by the user using C/C++ or RTL in order to perform the desired algorithm. In this manner, the user can select, change, and customize the PTM engine to perform any known, or future, network traffic algorithm so long as the algorithm relies on the features provided. The PTM engine has the flexibility of a pure software traffic management service with the advantage of performing the service entirely in hardware, thereby reducing the burden on the CPU in the server.

FIG. 1 is a block diagram of a communication system 100 with a PTM engine 135, according to an example. The communication system 100 includes a host 105 (e.g., a computing system such as a standalone server, blade server, laptop, etc.) connected to a network 180 (e.g., the Internet or a local area network (LAN)). The host 105 includes a processor 110, memory 115, and a NIC 125. The processor 110 represents any number of processing elements (e.g., CPUs) with any number of processing cores. The memory 115 (also referred to as host memory) can include volatile and non-volatile memory elements. In this example, the memory 115 stores a PTM driver 120 (e.g., a software application executed on the processor 110) which enables a user to configure the PTM engine 135. For example, using C/C++, python, or P4, the PTM driver 120 permits a user to access matching table 315, switch between DT and RR algorithms implemented and update parameters such as quantum and timeout in the PTM engine 135. The details for programming the PTM engine 135 will be discussed in detail below.

The NIC 125 includes an integrated circuit (IC) 130 that can be an application specific integrated circuit (ASIC), field programmable gate array (FPGA), or system on a chip (SoC) that includes hardened circuitry, programmable logic, or combinations thereof. Further, while the IC 130 is shown as being in the NIC 125, in other embodiments, the IC may be external to the NIC 125 and may serve as an interface between the processor 110/memory 115 and the NIC 125. Further, rather than the IC 130 (and the PTM engine 135 embodied therein) being in a host 105, the IC 130 may be used in switches and middle-boxes.

The IC 130 illustrates that the PTM engine 135 includes non-programmable hardware components 140 and programmable hardware components 165. The non-programmable hardware components 140 are shared by all the network schedule algorithms that may be implemented by the PTM engine 135. Put differently, the non-programmable hardware components 140 are used regardless of the particular network scheduling algorithm the PTM engine 135 is currently programmed to perform. Thus, when the PTM engine 135 is programmed to perform a different network scheduling algorithm, the non-programmable hardware components are reused. However, as discussed below, some of the features provided by the non-programmable hardware components 140 may not be used by the particular algorithm. That is, the selected algorithm may need only a subset of the features provided by the non-programmable hardware components 140.

In this example, the non-programmable hardware components 140 includes a packet classifier 145, a queue manager 150, a queue dispatcher 155, and a shaper 160 implemented in circuitry in the IC 130. The details of the components are discussed in more detail in the figures that follow.

The programmable hardware components 165 include circuitry in the IC 130 and the PTM engine 135 that is configurable using the PTM driver 120. In this example, the programmable hardware components 165 have components for implementing two different types of network scheduling algorithms: DT algorithms using a DT module 170 and RR algorithms using a RR module 175. For example, the DT module 170 and the RR module 175 may be implemented using programmable logic (e.g., as part of FPGA or a SoC) or a domain specific engine (e.g., as part of an ASIC). In any case, the DT module 170 or the RR module 175 leverages the features provided by the non-programmable hardware components 140 to perform the desired network scheduling algorithm. The selection of DT or RR module is configured via the PTM driver 120. While this disclosure describes programmable modules for DT and RR algorithms, other types of modules for other types of network scheduling algorithms are also possible.

Figure 2:
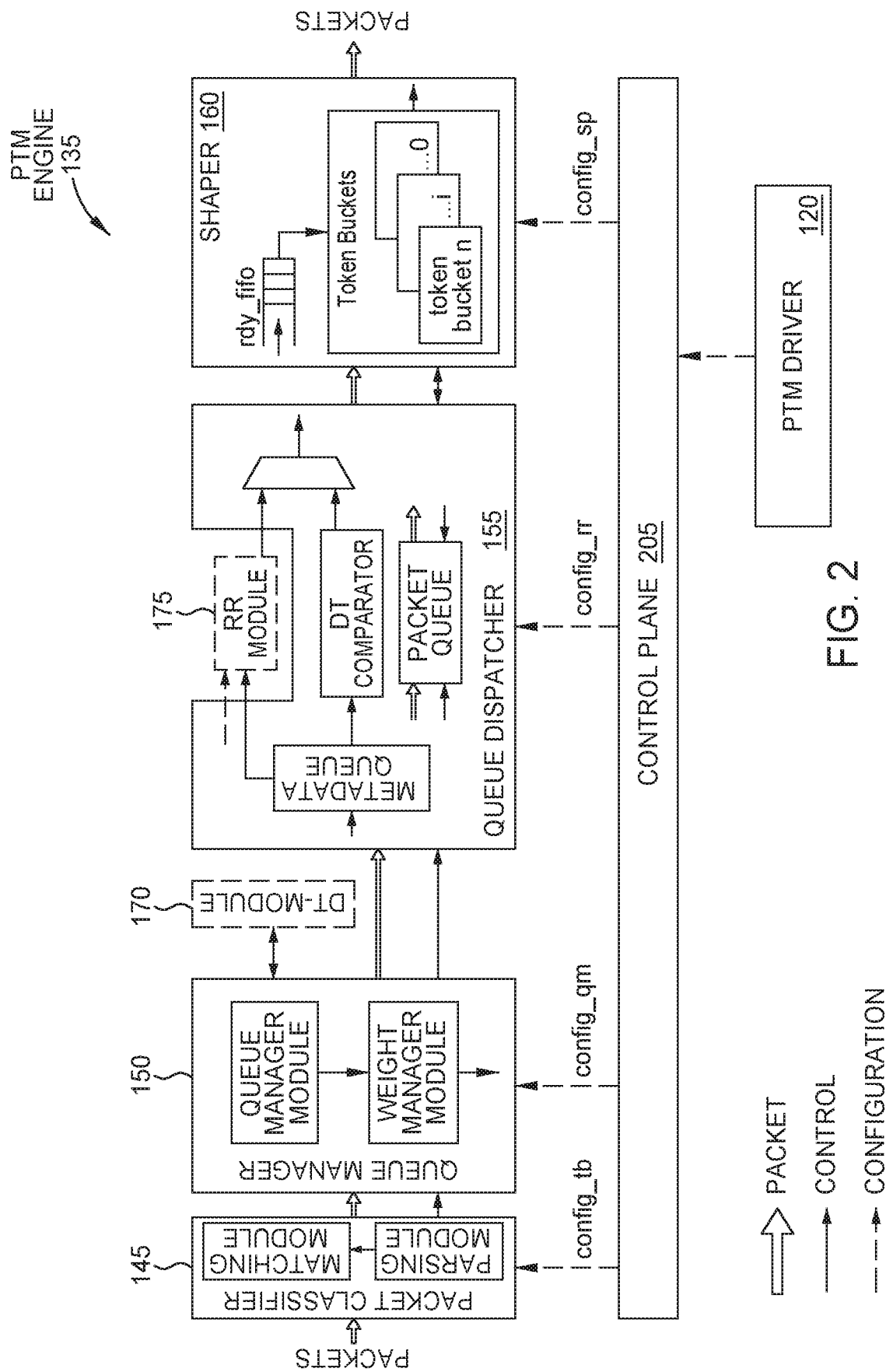
FIG. 2 illustrates a programmable traffic management engine, according to an example.

FIG. 2 illustrates a detailed version of the PTM engine 135 introduced in FIG. 1, according to an example. As discussed above, the PTM engine 135 has non-programmable hardware components that are common (shared) and reusable portions of the PTM engine across different network scheduling algorithms, while the programmable hardware components are programmable to perform a network scheduling algorithm selected by a designer.

The non-programmable hardware components (also referred to as the shell of the PTM engine 135) includes the packet classifier 145 which is used to extract flow ID of a given network packet as a key and lookup a weight and rate associated with the key, the queue manager 150 which keeps track of availability of queue resource and aggregated weights of active queues, the queue dispatcher 155 which buffers packets and metadata and decides the sending order of each flow, and the shaper 160 which control the sending rate of each flow for bandwidth throttling.

In one embodiment, the interfaces between these non-programmable hardware components and the programmable hardware components (e.g., the DT module 170 and the RR module 175) are fixed. Traffic scheduling algorithms related to DT such as weighted fair queueing and strict priority are implemented in the DT module 170, while RR algorithms and their variants such as deficit round robin and weighted round robin algorithms are performed by the RR module 175. The PTM engine 135 also interfaces with a control plane 205 which is used by the PTM driver 120 to configure components in the PTM engine 135. This configuration can be done either locally from the host or remotely from external servers over encrypted/non-encrypted channel via communication protocols such as remote procedure call (RPC), P4Runtime, simple network management protocol (SNMP), etc. The architecture of the PTM engine 135 provides flexibility to designers to customize and program various network scheduling algorithms either with high level or low-level descriptions in the DT and RR modules 170, 175.

When a packet arrives at PTM, the packet classifier (PC) module derives a flow ID (fid) as a key for the packet via parsing. By searching its preconfigured flow table with the derived key, the packet classifier 145 provides the corresponding table value containing weight and rate of requests. The flow table contains a set of mappings (fid-><weight, rate>) that can be configured locally or remotely by the control plane 205. The packet classifier 145 also calculates length of the packet and constructs control data (i.e., metadata) that contains <fid, weight, rate, packet length> as an output to the queue manager 150.

The queue manager 150 checks whether the fid it received from the packet classifier 145 matches an existing record, <fid, qid>, where qid is the unique queue ID assigned to the network flow of the received packets. If there is no matching record, this indicates that the flow is a new entry, a new qid for this flow is allocated, and the mapping <fid, qid> is registered in the queue manager 150. In addition, the queue manager 150 may update weights of each newly-assigned queue and keep track of aggregated weight of the active queues. When there is no packet arriving at a queue for a certain period (i.e., the flow becomes inactive), the corresponding qid assigned to that flow is claimed back where the qid (and corresponding queue) can be assigned to a different flow. The input data of the DT module 170 is constructed in the queue manager 150 for calculating DT of a packet. The queue manager 150 generates control data and metadata that is provided to the queue dispatcher 155 for further processing.

Packet data and its metadata are stored in a packet queue and a metadata queue of the queue dispatcher 155, respectively. The queue dispatcher 155 may drop a packet and its metadata if there is no qid assigned (due to no available queue resource) to it or the allocated queue is full. In the example shown in FIG. 2, there are two dispatching modes supported in this module: DT and RR modes which can be configured by users or developers. In the DT mode, the queue dispatcher 155 outputs a qid with the minimum DT value, while in the RR mode, it sends the qids of each non-empty queue in circular order. The queue dispatcher 155 transmits the output qid, together with packet length and rate of the flow, forms control data, and metadata to the shaper 160 for rate control.

Traffic regulation in the shaper 160 is based on token buckets. Token size is increased at a given rate extracted from the metadata provided by the queue dispatcher 155. In one embodiment, the shaper 160 sends out a packet only if its packet length is less than its token size.

FIGS. 3-6 provide detailed descriptions regarding the packet classifier 145, the queue manager 150, the queue dispatcher 155, and the shaper 160 introduced in FIG. 2.

Figure 3:
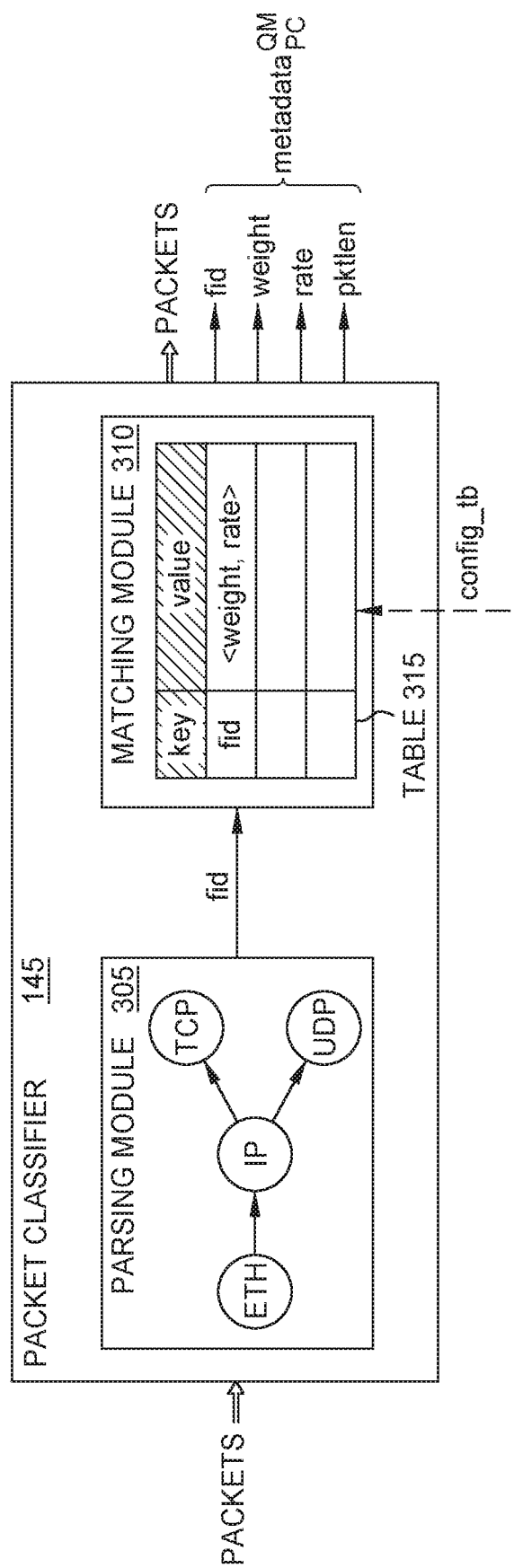
FIG. 3 illustrates a packet classifier in a programmable traffic management engine, according to an example.

FIG. 3 illustrates the packet classifier 145 in a PTM engine, according to an example. The packet classifier 145 is used to classify packets into flows and acquire configuration data such as weight and rate of requests for each flow. The packet classifier 145 includes a parsing module 305 and a matching module 310 containing a table 315. The table 315 can be designed with hashing, trie-based methods, binary/ternary content addressable memory (BCAM/TCAM), and other flow/traffic classification methods. The packet classifier 145 can be designed with high-level synthesis tools using P4, C/C++, etc. or RTL using Verilog/VHDL.

When a packet arrives at the packet classifier 145, the parsing module 305 extracts information from the packet to construct a fid which is used as a key to search the table 315. The fid (or key) can be constructed by any data in a packet such as source/destination IP address, IP number, source/destination ports and payload. With the derived fid/key, the matching module 310 looks in the table 315 for a weight and rate stored in a table entry value corresponding to the fid/key. In one embodiment, the weight defines a priority of the packet's corresponding flow, while rate is used to decide output (sending or receiving) rate for the flow. If the fid does not have a match, then the matching module 310 may use default values. That is, users may configure the table to have weights and rates for only a subset of flows (which they want to treat differently from other flows) that may be processed by the PTM engine. If a packet is received that does not match an entry in the table, that packet is assigned the default weight and rate values.

Both weight and rate are configured by users via the config_tb interface and the control plane (not shown) to populate the entries in the table 315. The config_tb interface can be implemented, e.g., with the AXI-Lite (Advanced eXtensible Interface-Lite) interface.

In addition to identify the weight and rate for each packet, the packet classifier 145 calculates packet length (pktlen) of each packet and outputs control data (i.e., the metadata $data_{QC}^{QM}$) to the queue manager. In the example, the control data includes the fid, weight, rate, and packet length.

Figure 4:
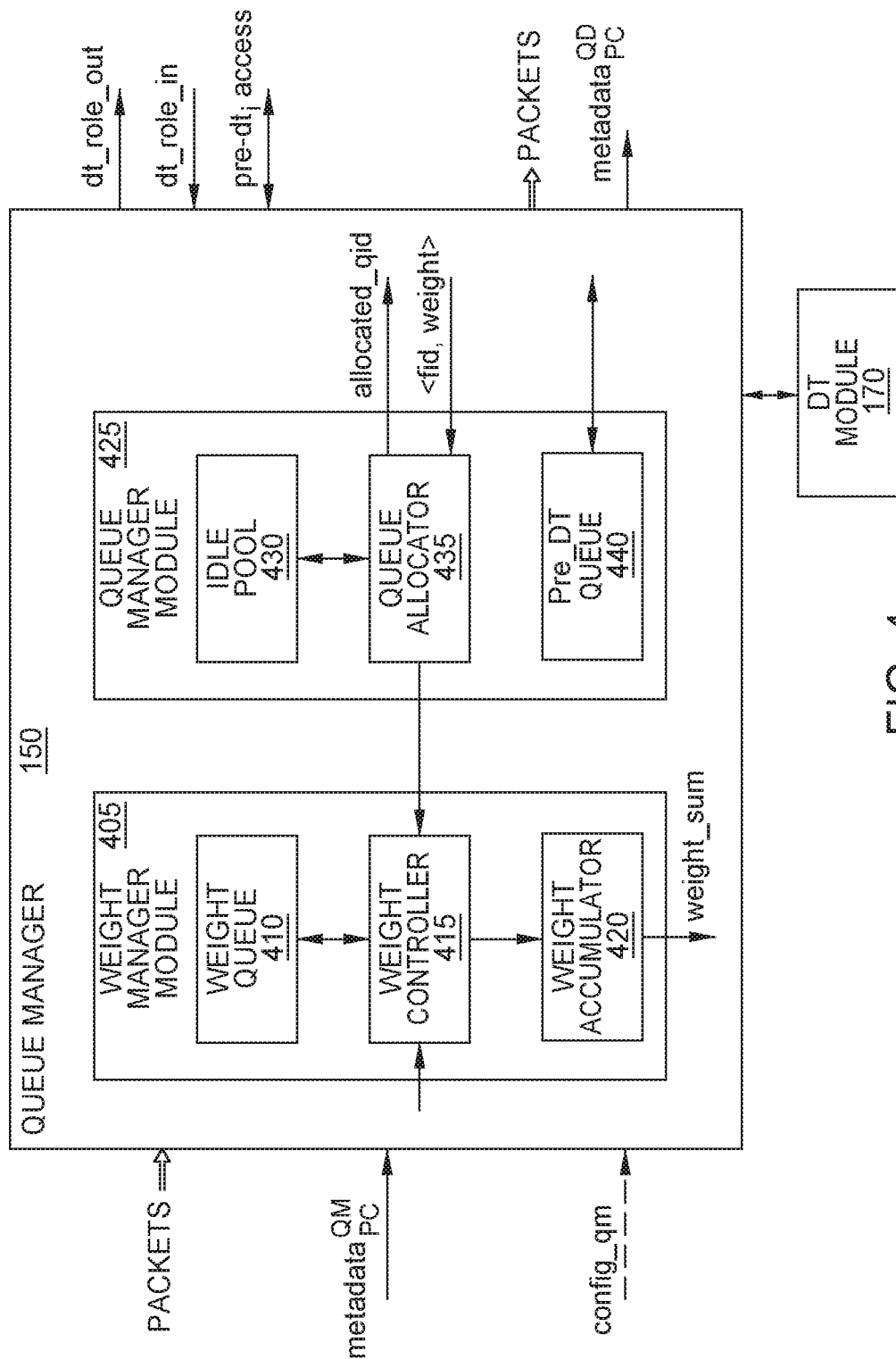
FIG. 4 illustrates a queue manager in a programmable traffic management engine, according to an example.

FIG. 4 illustrates the queue manager 150 in a PTM engine, according to an example. The queue manager 150 keeps track of availability of queue resources and aggregated weight of active queues and includes a weight manager module 405 and a queue manager module 425. The queue manager module 425 maintains queue resources by assigning unique qids to new flows and claiming back qids assigned to expired/inactive flows. The weight manager 405 accumulates weight of each active queue and records weight for each queue. The queue manager module 425 permits the PTM engine to support a number of flows much larger than physical queue resource. That is, only a subset of the possible flows may be actively sending packets to the PTM engine in a given time window. These active flows can be assigned qids while the flows not actively generating packets are not. The queue manger module 425 can constantly, or at intervals, evaluate the flows to determine when a previously active flow has now become inactive or has expired (e.g., the PTM engine has not received a packet corresponding to the flow for a predefined time period). The queue manager module 425 can then reassign the qid to a different flow. In this manner, the number of queues used to service the flows can be reduced.

The queue manager 150 also has a timer counter to record virtual time (VT) for the whole system, which might be used to calculate departure time (DT) in the connected modules.

The queue manager module 425 contains three components: a queue allocator 435, an idle pool 430 and a pre_DT queue 440. When receiving the control data (metadata$_{QC}^{QM}$) from the packet classifier, the queue manager module 425 extracts fid and weight. The queue allocator 435 then first checks whether it has cached a record, <fid, qid>. If there is no record this indicates that the flow is a new entry, the queue allocator 435 issues a request to the idle pool 430 for a new available qid. The idle pool 430 keeps track of the qids of queues that have an idle status. After obtaining a new qid or identifying the already assigned qid, the queue manager module 425 forwards the weight to the weight manager 405 for updating the weight of the corresponding queue and aggregated weight (weight_sum). The queue manager module 425 also has a timeout logic to decide when to claim back qids assigned to flows that are now inactive or expired. If there is no packet of a flow coming in a certain period, the timeout logic will be triggered, and the queue manager module 425 returns the qid to the idle pool 430 and clears a corresponding cached entry. The timeout period can be configured via the control interface, config_qm, which can be implemented with the AXI-Lite interface.

The pre_DT queue 440 is used to store DT of top elements in each active queue calculated from the DT module (not shown in FIG. 4). The pre_DT queue 440 provides a request/update interface to the DT module for communication. This interface can be implemented with random access memory (RAM) read/write interface.

The weight manager module 405 is composed of three components: a weight queue 410, a weight controller 415, and a weight accumulator 420. The weight queue 410 records weight of each active queue—i.e., a queue where its qid has been assigned to a flow. When obtaining qid and weight from other components, the weight controller 415 may first check whether the weight queue 410 has data for the queue by sending a read request. If there exists a record in the weight queue 410 and the returned data does not match the weight received from the queue manager module 425, the weight controller 415 issues a write request to update the weight queue 410 and activate the weight accumulator 420 to recalculate the aggregated weight of all the active queues. The aggregated weight is used in the DT module.

To communicate with the DT module, the queue manager 150 provides a DT_role_in interface, a DT_role_out interface and a memory access (pre_DT) interface. In one embodiment, the DT_role_in and DT_role_out interface have the same data structure that contains <qid, pktlen, VT, DT, weight, weight_sum, new_flow, qids_all_occupied>, where new_flow indicates that the flow is a new entry and qids_all_occupied is a flag indicating that no queue resource is available.

The queue manager 150 outputs control data (i.e., metadata$_{QC}^{QM}$) which contains <qid, DT, pktlen, rate, qids_all_occupied> to the downstream queue dispatcher.

Figure 5:
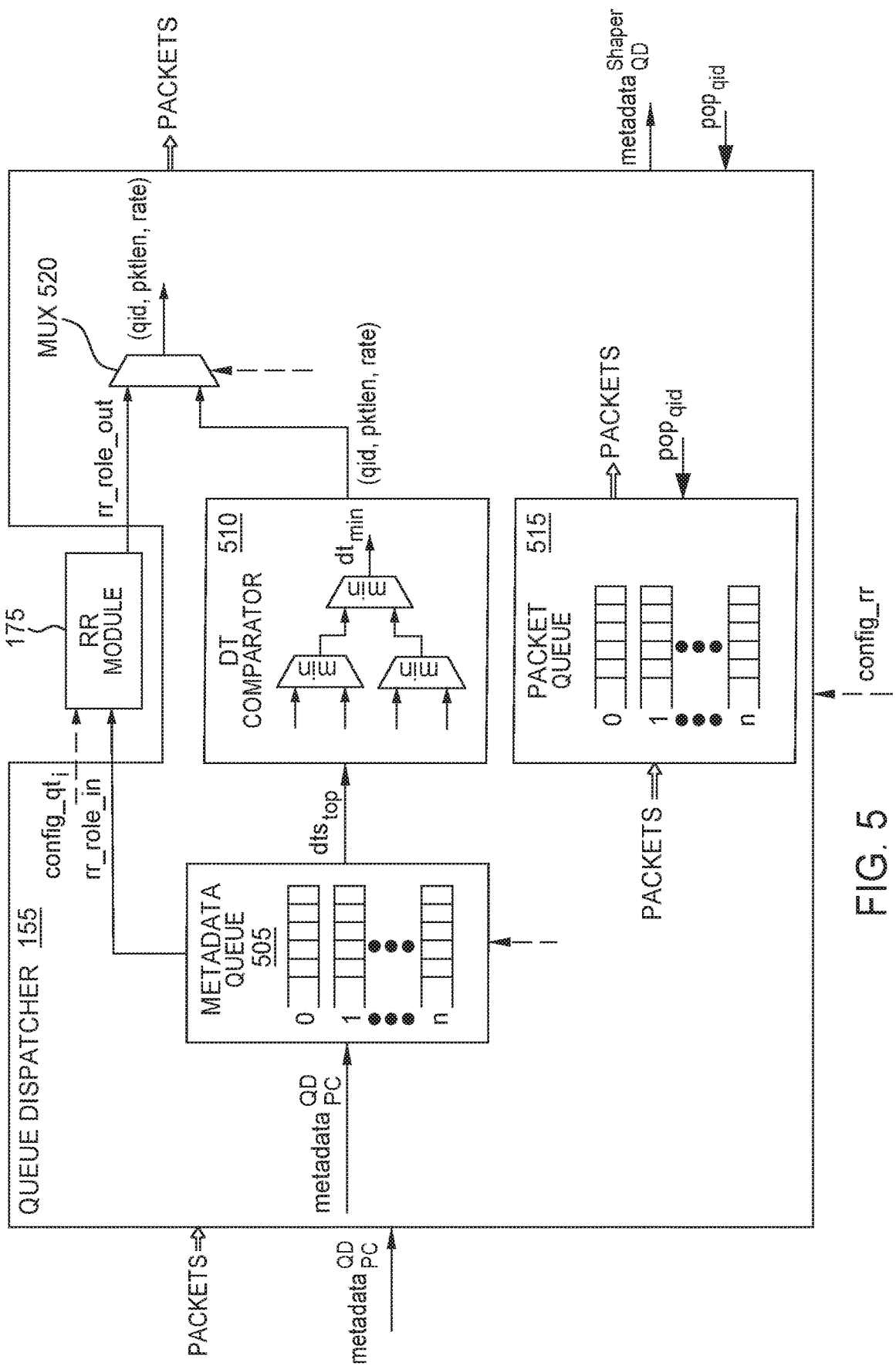
FIG. 5 illustrates a queue dispatcher in a programmable traffic management engine, according to examples.

FIG. 5 illustrates the queue dispatcher 155 in a PTM engine, according to examples. The queue dispatcher 155 decides sending order of packets belonging to different flows and is composed of three components: a metadata queue 505, a packet queue 515, and a DT comparator 510. Packet data and the control data (i.e., metadata$_{QC}^{QM}$) received from the queue manager 150 are stored in the packet queue 515 and the metadata queue 505, respectively, using the corresponding qid. If qids_all_occupied is asserted high, in one embodiment the queue dispatcher 155 drops the packet and its metadata since there is no queue resource for a new flow. Similarly, if a specific queue is full in the packet queue 515, all packets and their metadata for that flow are discarded.

The queue dispatcher 155 in FIG. 5 includes hardware for supporting two dispatching modes: DT and RR modes. Developers can use a control interface, config_rr to select which of these modes is currently active. In one embodiment, only one of these modes (and the corresponding DT/RR modules) is active in the PTM engine at any given time. In the DT mode, the queue dispatcher 155 outputs a qid with the minimum DT value, while in the RR mode, the queue dispatcher 155 sends qid of each non-empty queue in circular order. The control output (i.e., metadata$_{QD}^{Shaper}$) of the queue dispatcher 155 to the shaper includes pktlen, qid, and rate.

When operating in the DT mode, the metadata queue 505 picks top metadata elements (dts$_{top}$) of all non-empty queues and instructs the DT comparator 510 to obtain a qid with the minimum DT value. Using the metadata$_{QD}^{Shaper}$ of the packet with the minimum DT value, as discussed in FIG. 6, the shaper decides when to send actual packet data stored in the packet queue 515 and issues a read signal (pop$_{qid}$) to get data in the corresponding queue.

When operating in the RR mode, qids of non-empty queues are selected in circular order according to round-robin scheduling algorithms implemented in the RR module 175. The remaining operation of the queue dispatcher 155 is the same as when operating in the DT mode.

To communicate with the RR module 175, the queue dispatcher 155 provides a RR_role_in interface and a RR_role_out interface. The RR_role_in interface contains VLD, qid, weight, pktlen and rate, while RR_role_out interface includes qid, pktlen and rate. The control interface, config_rr, configures DT/RR modes and quantum values of queues with config_qt$_i$. This control interface can be implemented with the AXI-Lite interface. The quantum values can be leveraged to develop various RR scheduling algorithms in the RR module 175 such as deficit round robin and deficit weighted round robin.

Figure 6:
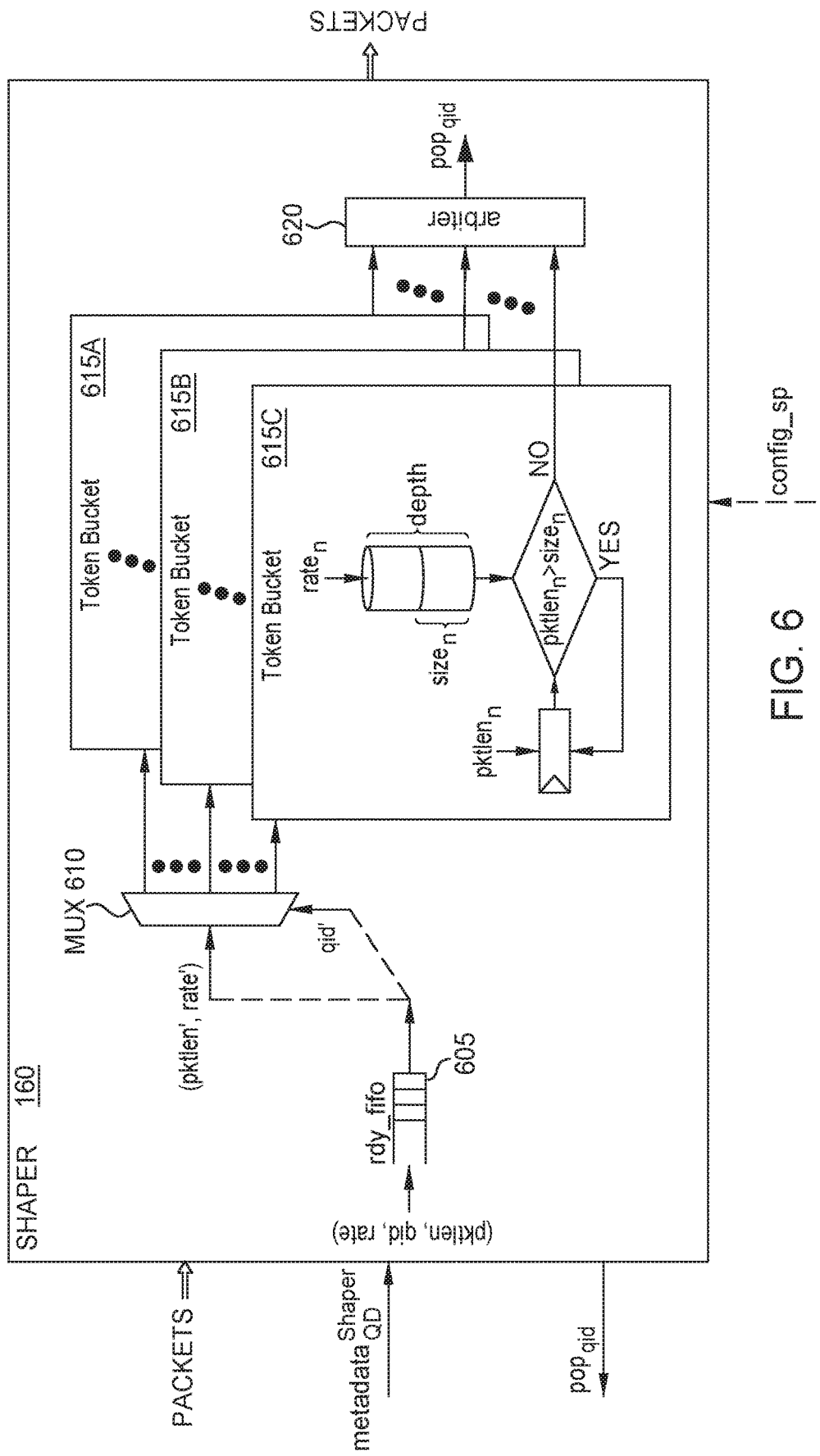
FIG. 6 illustrates a shaper in a programmable traffic management engine, according to an example.

FIG. 6 illustrates the shaper 160 in a PTM engine, according to an example. The shaper 160 controls sending rate of each flow for bandwidth throttling and includes a rdy_FIFO 605, token buckets 615 (i.e., a token bucket cluster), and an arbiter 620. The rdy_FIFO 605 buffers the metadata received from the queue dispatcher 155. The receiving order of data in the rdy_FIFO 605 indicates results of packet scheduling algorithms in the DT or RR modules. As shown, the qid is used as a select signal for a multiplexer (mux) 610 to select which of the token buckets 615 should receive the pktlen and rate for the corresponding packet being output by the FIFO 605.

In one embodiment, each of the token buckets 615 corresponds to one the packet queues 515 in FIG. 5. The token buckets 615 regulate packet data of a flow to perform network policing and shaping. Tokens represent a unit of bytes depending on width of data buses of different line-rate systems. The depth of each token bucket 615 depicts the maximum number of tokens that can be stored, while the size, indicates current available tokens in the buckets 615. In one embodiment, tokens are added to the buckets 615 at a fixed rate, which may be set in the packet classifier by users.

When acquiring the top element <pktlen qid', rate'>, from the rdy_FIFO 605 via the mux 610, the token bucket 615 receiving the data first checks whether rate' is equal to the current rate setting, rate$_{qid'}$. If the two rates have the same value, this indicates that the packet belongs to an old flow configured before. If pktlen' is less than available token size, $size_{qid'}$, the corresponding token bucket 615 releases the qid' to the arbiter 620. Stated differently, the token bucket 615 has more tokens in its bucket than the length of the packet. Otherwise, the token bucket 615 blocks the qid' until pktlen' is less than $size_{qid'}$. That is, the token bucket 615 waits until more tokens are added according to a predefined rate. Once the bucket 615 has more tokens than the packet length, the qid' is forwarded to the arbiter 620.

When rate' is different from $rate_{qid'}$, the token bucket 615 replaces its rate with rate' and resets $size_{qid'}$ to 0. Because several token buckets 615 can release qids at the same time to the arbiter 620, this leads to congestion as packets of different flows share the same data bus. To resolve this congestion issue, all the qids with ready statuses are buffered in the arbiter 620. If multiple qids are received, the arbiter 620 selects one of the qids (and corresponding packet) for transmission. In one embodiment, the arbiter 620 selects qids in a circular order and generates $pop_{qid}$ signal indicating which packet queue 515 in the queue dispatcher 155 in FIG. 5 can transmit a packet. That is, the shaper 160 sends the $pop_{qid}$ signal to the queue dispatcher 155 so it knows which packet queue 515 should be transmitted using a shared data bus.

In one embodiment, if a token bucket 615 assigned to a flow remains idle for a predefined time period, its available token size can be reset according to token timeout set by users. The token timeout value can be configured via the control interface, config_sp, which can be implemented with the AXI-Lite interface.

As mentioned above, the PTM engine reserves the roles for developers to customize network scheduling algorithms. The DT and RR modules 170, 175 in FIG. 2 can be designed on an FPGA (e.g., using HLS with high-level specifications such as ClC++, or using RTL with Verilog/VHDL) or interfaced with a co-processor such as RISC (Reduced-Instruction-Set-Computer) cores. The DT module 170 can be used to develop algorithms required to calculate departure time or priority of each packet/flow, while the RR module 175 can be utilized to design many round-robin variants which are not related to departure time. Leveraging the DT and RR modules 170, 175, developers can focus on developing network scheduling algorithms instead of the time-consuming system integration.

Both DT- and RR-based algorithms can be abstracted and defined as a function of a set of features, which are inputs to the algorithms. FIG. 7 is a table of example DT algorithms that can be supported by features generated by the PTM engine, according to an example. The features in the table 700 contain queue ID (qid), packet length (pklen), virtual time (VT), previous departure time (pre_DT), weight and aggregated weight (weight_sum). With those features, developers can design and implement a large set of DT-related algorithms including but not limited to the algorithms listed in Table 700. To support programmability and customization of the PTM engine, the interface of the DT module 170 can receive qid, pktlen, VT, DT, weight, weight_sum, new_flow, and qids_all_occupied. The DT module 170 can also communicate with the pre_DT queue 440 in FIG. 4 for recording departure times calculated of a packet of the flow. The interface for the DT module 170 may be implemented with a RAM read/write interface.

FIG. 8 is a table 800 of example round robin algorithms that can be supported by features generated by the PTM engine, according to an example. The table 800 depicts required features (or inputs) of three representative RR-related algorithms. The features include qid, weight, pktlen and quantum. Those features can be utilized to express many round-robin algorithm variants including but not limited to Round Robin (RR), Weighted Round Robin (WRR), Deficit Round Robin (DRR), Deficit Round Robin with priority (DRR+ and DRR++) and Modified Deficit Round Robin (MDRR).

To support various round-robin algorithms and provide customization in PTM, the interface of the RR module 175 in FIG. 2 can receive or generate the features listed in table 800. The interface of the RR module 175 can receive vld, qid, weight, pktlen, and rate as inputs, while outputting qid, pktlen, and rate. The vld signal may be asserted high for every new packet coming.

Figure 9:
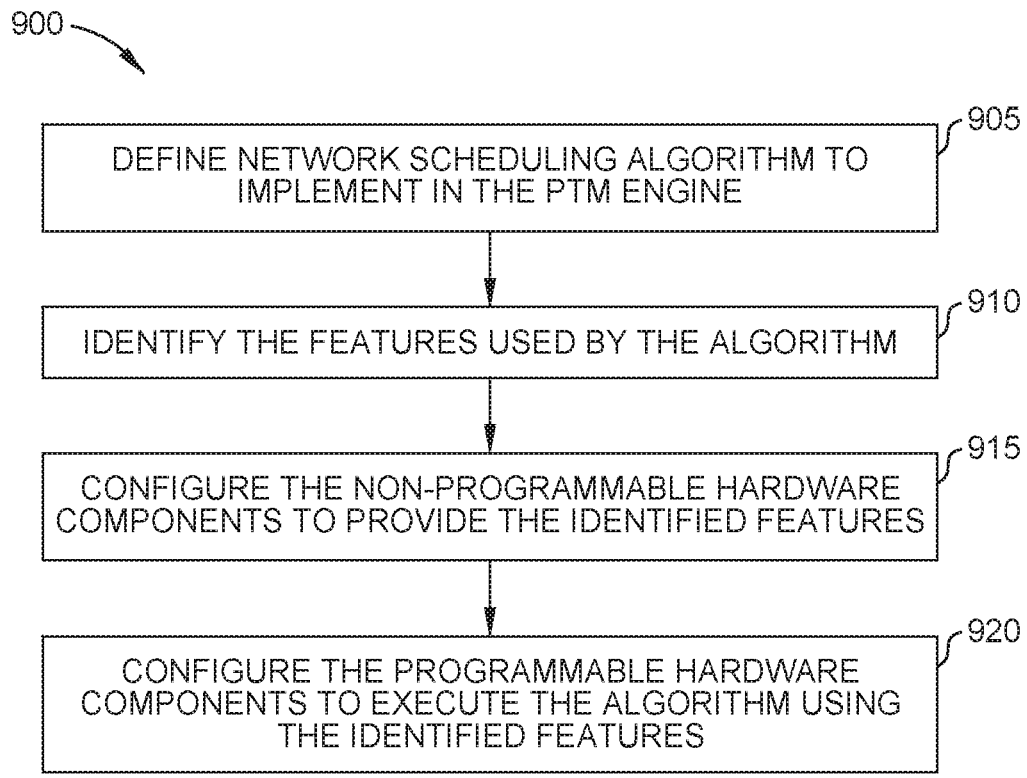
FIG. 9 is a flowchart for programing or replacing DT or RR algorithms in a PTM engine, according to one example.

FIG. 9 is a flowchart of a method 900 for programing or replacing DT or RR algorithms in a PTM engine, according to one example. At block 905, a user defines a network scheduling algorithm to implement in the PTM engine. For example, the user may use a high-level programming language (e.g., C/C++) with HLS tools or RTL to define the algorithm.

As discussed above, the algorithm may be a DT or RR type algorithm. However, the embodiments are not limited to these types of algorithms. Other types of algorithms can also be supported by the PTM engine, which may mean the PTM engine can have additional programmable components (in addition to, or in replacement of the DT and RR modules).

At block 910, a developer identifies the features used by the network scheduling algorithm. As shown in FIGS. 7 and 8, some of the DT and RR based algorithms only use a subset of the features provided by the non-programmable hardware components (e.g., the packet classifier, queue manager, queue dispatcher, and the shaper) while other algorithms use all the features. For example, in FIG. 7, the First in, First Out DT algorithm uses only qid and VT as inputs, while the Weight Fair Queueing DT algorithm uses all the features as inputs.

When defining the algorithm, the developer may stipulate which features are needed as inputs and which of the features provided by the PTM engine are not.

At block 915, the developer configures the non-programmable hardware components to provide the identified features to the programmable hardware component (or components) in the PTM engine. In one embodiment, the developer uses the control plane 205 vis the PTM driver 120 to configure the non-programmable hardware components. For example, if the algorithm is a RR based algorithm, the developer may configure the non-programmable hardware components to provide the identified features to the RR module in the PTM engine. Conversely, if the algorithm is a DT algorithm, the developer configures the non-programmable hardware components to provide the identified features to the DT module in the PTM engine.

At block 920, the developer configures the programmable hardware components to execute the algorithm using the identified features. That is, using the features provided by the non-programmable hardware components, the developer configures the programmable component (e.g., the DT or RR module) to execute the algorithm using the features as inputs. In one embodiment, only one of the DT or RR module is active at a given time when the PTM engine is operating (depending on the type of network scheduling algorithm selected) while the other is inactive or unused. As mentioned above, these modules may be implemented using programmable logic or a domain specific engine. Once configured, the PTM engine can then execute as described in FIGS. 2-6 above.

Figure 10:
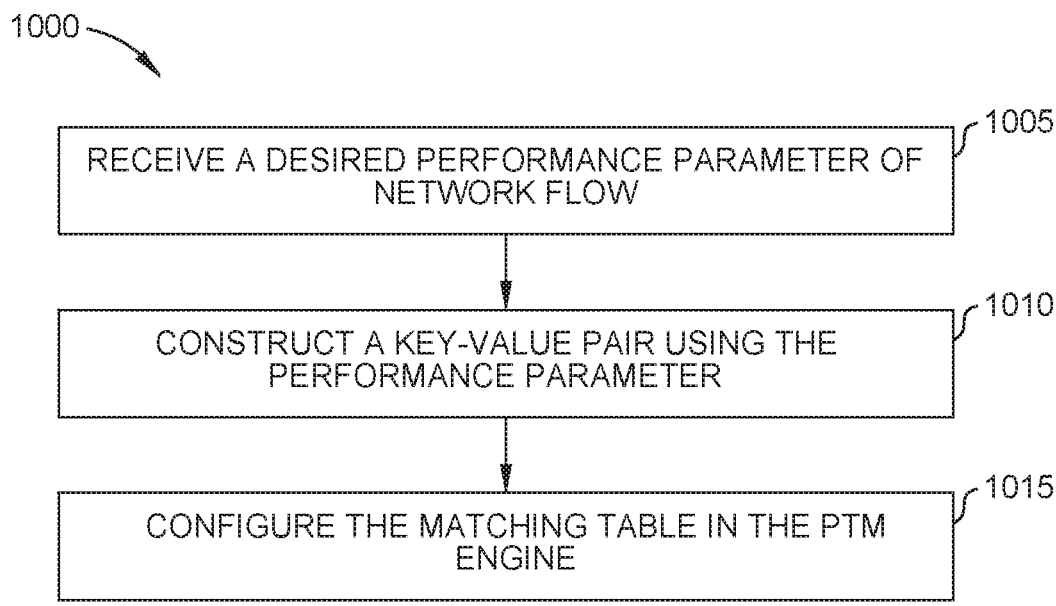
FIG. 10 is a flowchart for configuring a PTM engine, according to one example.

FIG. 10 is a flowchart of a method 1000 for configuring a PTM engine, according to one example. At block 1005, the PTM driver receives a desired performance parameter of network flow. The performance parameter can include a priority, weight, desired rate, and the like. In one embodiment, the PTM driver also constructs the ID for the flow.

At block 1010, the PTM driver constructs a key-value pair which maps the flow ID to the value of the performance parameter received at block 1005.

At block 1015, the PTM driver configures the matching table in the PTM engine. That is, the PTM driver stores the key-value in the table 315 (i.e., a matching table) of the matching module 310 illustrated in FIG. 3.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A programmable traffic management (PTM) circuit, comprising:
multiple non-programmable hardware components configured to output a predetermined set of features of a network traffic flow; and
multiple programmable hardware components configured to compute respective user-selectable network scheduling algorithms based on respective subsets of the predetermined set of features;
wherein the multiple non-programmable hardware components comprise a queue dispatcher configured to determine a sending order of packets of the network traffic flow based on an output of one or more of the programmable hardware components.

2. The PTM circuit of claim 1, wherein the queue dispatcher is further configured to determine the sending order of packets based on the output of a user-selected one of the programmable hardware components.

3. The PTM circuit of claim 1, wherein the programmable hardware components are associated with respective dispatch modes, and wherein the queue dispatcher is further configured to determine the sending order of the packets based on the output of the programmable hardware component associated with a user-selected one of the dispatch modes.

4. The PTM circuit of claim 1, wherein a first one of the programmable components is configurable with one of multiple user-selectable departure time (DT) algorithms, and wherein a second one of the programmable components is configurable with one of multiple user-selectable round-robin (RR) algorithms.

5. The PTM circuit of claim 1, wherein the subsets of the predetermined set of features are user-selectable.

6. The PTM circuit of claim 1, wherein the non-programmable hardware components and the programmable hardware components are implemented on a same integrated circuit.

7. The PTM circuit of claim 6, wherein the programmable hardware components are implemented using programmable logic or a domain specific engine on the same integrated circuit.

8. A method, comprising:
outputting a predetermined set of features of a network traffic flow from non-programmable hardware components of a programmable traffic management (PTM) circuit, wherein the non-programmable hardware components comprises a queue dispatcher circuit; and
determining a sending order of packets of the network traffic flow by the queue dispatcher circuit based on an output of one or more of multiple programmable hardware components of the PTM circuit, wherein the programmable hardware components are configured to compute respective user-selectable network scheduling algorithms based on respective subsets of the features.

9. The method of claim 8, wherein the determining comprises:
determining the sending order of packets based on the output of a user-selected one of the programmable hardware components.

10. The method of claim 8, wherein the programmable hardware components are associated with respective dispatch modes, and wherein the determining comprises:
determining the sending order of packets based on the output of the programmable hardware component associated with a user-selected one of the dispatch modes.

11. The method of claim 8, further comprising:
configuring a first one of the programmable components with one of multiple user-selectable departure time (DT) algorithms; and
configuring a second one of the programmable components with one of multiple user-selectable round-robin (RR) algorithms.

12. The method of claim 8, further comprising:
permitting a user to select the subsets of the features for the respective programmable hardware components.

13. The method of claim 8, further comprising:
permitting a user to configure the programmable hardware components with the respective user-selectable network scheduling algorithms through a user-interface application.

14. The method of claim 8, wherein the non-programmable hardware components and the programmable hardware components are implemented on a same integrated circuit.

15. An integrated circuit, comprising:
non-programmable hardware components configured to provide a predefined number of features of a network traffic flow; and
programmable hardware components configured to compute respective user-selectable network scheduling algorithms based on respective subsets of the predetermined number of features;
wherein the non-programmable hardware components comprise a queue dispatcher circuit configured to determine a sending order of packets of the network traffic flow based on an output of one or more of the programmable hardware components.

16. The integrated circuit of claim 15, wherein the queue dispatcher circuit is further configured to determine the sending order of packets based on the output of a user-selectable one of the programmable hardware components.

17. The integrated circuit of claim 15, wherein the programmable hardware components are associated with respective dispatch modes, and wherein the queue dispatcher circuit is further configured to determine the sending order of the packets based on the output of the programmable hardware component associated with a user-selected one of the dispatch modes.

18. The integrated circuit of claim 15, wherein a first one of the programmable components is configurable with one of multiple user-selectable departure time (DT) algorithms, and wherein a second one of the programmable components is configurable with one of multiple user-selectable round-robin (RR) algorithms.

19. The integrated circuit of claim 15, wherein the subsets of the predetermined set of features are user-selectable.

20. The integrated circuit of claim 15, wherein the non-programmable hardware components further comprise:
- a packet classifier configured to extract a flow ID of a received network packet to use as a key and lookup a weight and rate associated with the key;
- a queue manager configured to track availability of queue resources and aggregated weights of active queues; and
- a shaper configured to control a sending rate of each of the plurality of flows for bandwidth throttling;
- wherein the queue dispatcher is further configured to buffer packets and metadata and determine a sending order of a plurality of flows.

* * * * *